Dec. 26, 1961   H. L. HUSTED ETAL   3,015,064
BIDIRECTIONAL ELECTRONIC COUNTER
Filed March 30, 1956   2 Sheets-Sheet 1

INVENTORS.
HOYT L. HUSTED
CLARENCE E. MILLER, Jr.
BY
William R Lane
ATTORNEY

United States Patent Office 3,015,064
Patented Dec. 26, 1961

3,015,064
BIDIRECTIONAL ELECTRONIC COUNTER
Hoyt L. Husted, Downey, and Clarence E. Miller, Jr., Whittier, Calif., assignors to North American Aviation, Inc.
Filed Mar. 30, 1956, Ser. No. 575,280
6 Claims. (Cl. 324—83)

This invention relates to a counter and more particularly to an electronic circuit for counting the cycles of two alternating current signals whose relative phase angle reverses to indicate change of direction.

Devices for counting the cycles of electrical signals of different phase usually employ some combination of mechanical and electronic systems such as a mechanical apparatus for counting and sensing direction coupled with an electronic amplifying system. Such measuring apparatus is necessarily complicated and often of questionable reliability.

The bidirectional counter contemplated by this invention is used for counting cycles of electrical signals which may represent, for example, shaft rotations. The counter is an electronic circuit which is capable of receiving two phase-reversible, alternating current waves of 90 degrees phase displacement from an alternating current resolver attached to a rotating shaft, and producing output signals indicating the direction and amount of shaft rotation.

It is therefore an object of this invention to provide a bidirectional counter.

It is a further object of this invention to provide an electronic circuit for determining the relative phase between two electrical signals.

It is still another object of this invention to provide a direction sensing circuit for phase-reversible electrical signals which are displaced in phase by 90 degrees.

It is a still further object of this invention to provide an electronic circuit which indicates the number of cycles and relative phase of electrical waves.

A further object of this invention is to provide a counter in which the selection and counting of signals is accomplished in a simple and reliable electronic circuit.

Other objects of invention will become apparent from the following description taken in connection with the accompanying drawings, in which.

Figure 1:
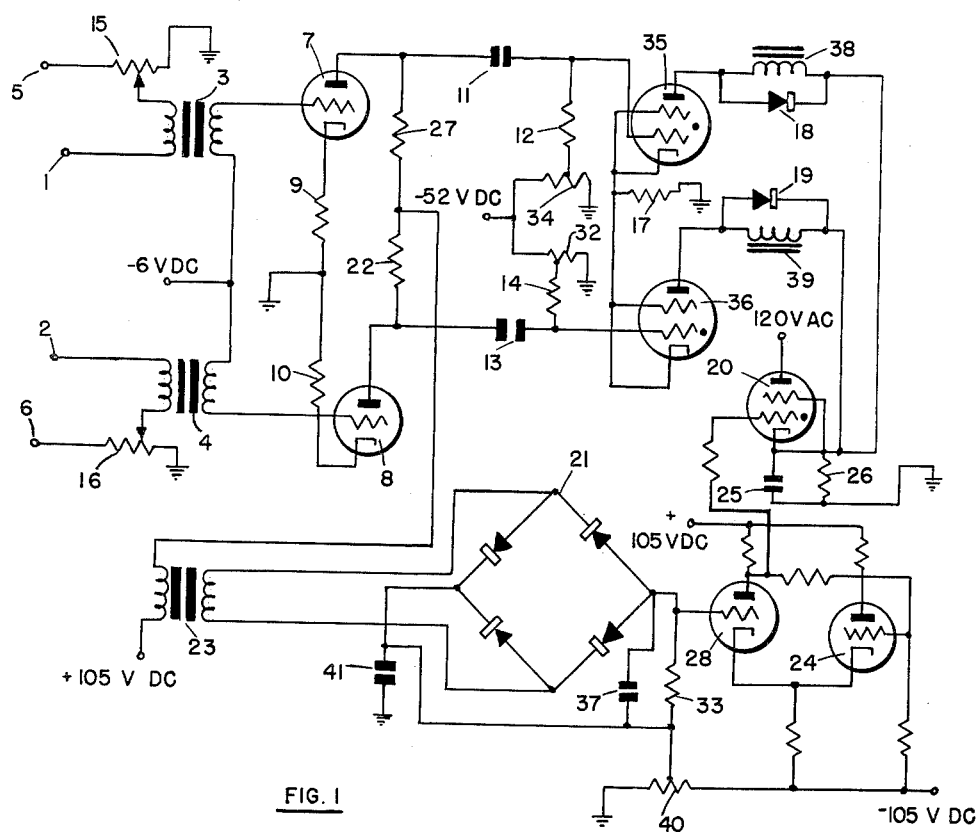
FIG. 1 is a circuit diagram of the device of this invention.

Referring now to FIG. 1, terminals 1 and 2 are connected to the source of the electrical signals to be counted. The electrical signals at terminals 1 and 2 are alternating current carriers which are amplitude modulated by a substantially sinusoidal wave form such as would be received from the output of a resolver which indicates shaft rotation. The modulation phase of the signals received at terminal 1 will either lead or lag the modulation phase of signals received at terminal 2 by 90 degrees. With clockwise rotation of the shaft, the signal at terminal 2 will lead the signal at terminal 1 in phase by 90 degrees and with counter clockwise rotation the signal at terminal 1 will lead the signal at terminal 2 in phase by 90 degrees. The signals are fed into the primaries of audio transformers 3 and 4, respectively, which act as phase sensitive demodulators. Here the signals are combined with an A.-C. reference voltage from terminals 5 and 6 which demodulates the input electrical signals. Potentiometers 15 and 16, when adjusted, balance the reference inputs. The output of transformers 3 and 4 is an A.-C. voltage with an amplitude which is proportional to the vector sum of the A.-C. reference signal and the incoming modulated A.-C. carrier. This modulated signal changes from minimum to maximum amplitude as the incoming signal varies from maximum in one carrier phase relationship, through zero, to maximum in the other carrier phase relationship. The output or secondaries of transformers 3 and 4 which contain the demodulated signals are connected at one end to a negative bias D.-C. voltage and connected at the other end to the grids of triodes 7 and 8 which act as nonlinear amplifiers. The cathodes of triodes 7 and 8 are connected together through resistors 9 and 10 to ground. The tube characteristics of triodes 7 and 8 and their operating potentials are selected so that very little current flows from the plate circuit to the cathode circuit of the tubes until the voltage on the grid circuits approaches maximum value at which time current flowing from the plate to cathode circuits of triodes 7 and 8 rises rapidly to a maximum amplitude. The output of triodes 7 and 8 is coupled through capacitor 11 for one plate circuit, and capacitor 13 for the other plate circuit to the grids of the counter thyratrons 35 and 36. The cathode circuits of thyratrons 35 and 36 are connected together to ground through resistor 17 to prevent both thyratrons from firing on each cycle. The signal grid circuits of thyratrons 35 and 36 are returned to a negative bias potential through resistors 12 and 14 and potentiometers 32 and 34. Thyratrons 35 and 36 are adjusted by potentiometers 32 and 34 to fire at a predetermined instaneous voltage level of the incoming electrical signals to be described below in reference to FIG. 2. Thus no filtering of the demodulated and amplified signal is required. The plate circuits of thyratrons 35 and 36 are connected to one side of inductances 38 and 39, respectively. The other sides of inductances 38 and 39 are connected through a common point to the cathode circuit of thyratron 20. The plate circuit of thyratron 20 is connected to a signal source of 120 volts alternating current. Diodes 18 and 19 function to dampen the back E.M.F. from inductances 38 and 39 when thyratrons 35 and 36 are cut off. Turning back to triodes 7 and 8, the plate circuits of the triodes are also connected through resistors 27 and 22 to one side of the primary of transformer 23. The other side of the primary is connected to a positive direct current voltage. The secondary of transformer 23 is connected to bridge rectifier 21 which rectifies the summation output from triodes 7 and 8 and applies this output to a trigger circuit consisting of triodes 24 and 28 which together comprises a monostable multivibrator. Specifically, the output of rectifier 21 develops a D.-C. voltage across resistor 33 with condenser 37 acting as a filter. Fixed bias for triode 28 is supplied through potentiometer 40 and by-passed by condenser 41. The plate circuits of triodes 24 and 28 are connected to a postive D.-C. voltage and the cathode circuits are connected through a common resistor to a negative D.-C. voltage. The plate circuit of triode 28 is connected to the control grid circuit of thyratron 20. Thyratron 20 acts as a grid control rectifier and when conducting feeds the signal from its plate which is an A.-C. signal through a filter comprising capacitor 25 and resistor 26. The values of capacitor 25 and resistor 26 which determine the true constant of the filter depend upon the frequency of the signal from triode 28 and the frequency of the signal at the plate of thyratron 20. The time constant of the filter is selected so that a sufficient amplitude of voltage is supplied to the plates of counter thyratrons 35 and 36 at all times when thyratron 20 is conducting. Thyratron 20 will be cut off upon receiving a signal from the output of the trigger circuit comprising triodes 24 and 28 when the voltage level at the grid of triode 28 reaches a predetermined point which will be discussed later in relation to FIG. 2.

In operation, the electrical signals received at terminals 1 and 2 differ in phase by 90 degrees, and for convenience the signal at terminal 1 will be called phase A and the signal at terminal 2 will be called phase B. Thus, phase A will lead or lag phase B by 90 degrees. If phase A is leading phase B, the signal through the current branch provided by terminal 1 and transformer 3 arrives at the grid of triode 7 before the corresponding signal from terminal 2 through transformer 4 arrives at the grid of triode 8. The output of triode 7, coupled to the control grid of thyratron 35, causes the thyratron 35 to fire. The cathode circuit of thyratron 35, connected to the cathode circuit of thyratron 36, biases the cathode of thyratron 36 so that the maximum signal applied to the control grid of thyratron 36 is not sufficient to cause conduction, and thus thyratron 36 is effectively locked out by the action of thyratron 35. The inductance in the plate circuit of thyratron 35 can be used to actuate any conventional register of electrical or mechanical pulses.

Turning to the second condition in which phase B is leading phase A, the operation of the circuit from terminal 2 to thyratron 36 is the same as above except that thyratron 36 fires ahead of thyratron 35 and through the common cathode connection between thyratrons 35 and 36, thyratron 35 is prevented from firing when the signal from terminal 1 reaches the control grid of thyratron 35. Likewise, a pulse register attached to the plate circuit of thyratron 36 records the output.

The counter thyratron receiving the signal of leading phase will continue to conduct and also to prevent the other counter thyratron from conducting until the D.C. voltage on the plate circuits of thyratrons 35 and 36 is removed. To do this a reset circuit receiving its input from triodes 7 and 8 is provided. The plate circuits of triodes 7 and 8 through resistors 27 and 22 provide a summation signal to the primary of transformer 23. This signal is rectified by bridge rectifier 21 and provides the signal to actuate the trigger circuit consisting of triodes 24 and 28 which act as a monostable multivibrator. In the normal state of the multivibrator, triode 24 is conducting. When the signal is received from rectifier 21, the grid of triode 28 rises above cutoff and the multivibrator reverses with triode 28 conducing and triode 24 nonconducting. Reset thyratron 20 is directly controlled by the action of triode 28. Thus when triode 28 conducts because of the action of the summation signal, reset thyratron 20 stops firing. The D.C. circuit from the plates of counter thyratrons 35 and 36 through inductances 38 and 39 to the cathode circuit of thyratron 20 is interrupted, thus causing both counter thyratrons 35 and 36 to return to a nonconducting reset state and thus be ready to count the next electrical signal from terminal 1 or terminal 2 whichever is leading in phase.

Figure 2:
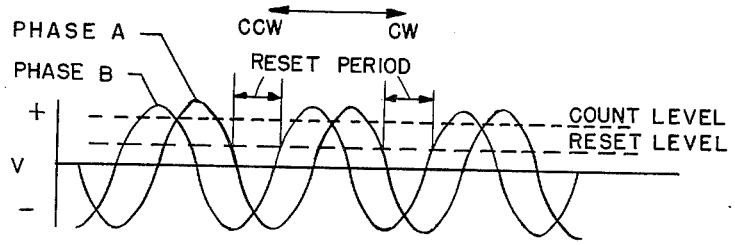
FIG. 2 is a graph illustrating the wave form and relative phase angle of the input electrical signals.

Referirng now to FIG. 2, a voltage versus time graph is shown of the two electrical signals received at terminals 1 and 2. The signal as received at terminal 2, called phase B, is leading the signal as received at terminal 1, called phase A, by 90 degrees. When the voltage on the phase B wave measured at the plate of triode 8 reaches a predetermined value called the count level, the plate circuit of triode 8, coupled to counter thyratron 36, causes thyratron 36 to conduct, thus emitting a count pulse in its plate circuit. When the signal applied to terminal 1 (phase A) reaches the count level, the voltage at the plate circuit of triode 7 is not of sufficient value to cause thyratron 35 to fire because of the bias on the cathode circuit of thyratron 35 received from the connection to the cathode circuit of thyratron 36, which is in the conduction state. Triodes 7 and 8, both conducting, provide a summation signal to the reset circuit. When the summation voltage provided by phase A and phase B descends to the predetermined value shown in FIG. 2 as the reset level, the summation voltage applied to the reset circuit drops to a value such that reset thyratron 20 is cut off, thereby removing the D.C. voltage on the plate circuits of counter thyratrons 35 and 36. Thyratrons 35 and 36 thus return to the state of nonconduction and are ready for the next signal.

Figure 3:
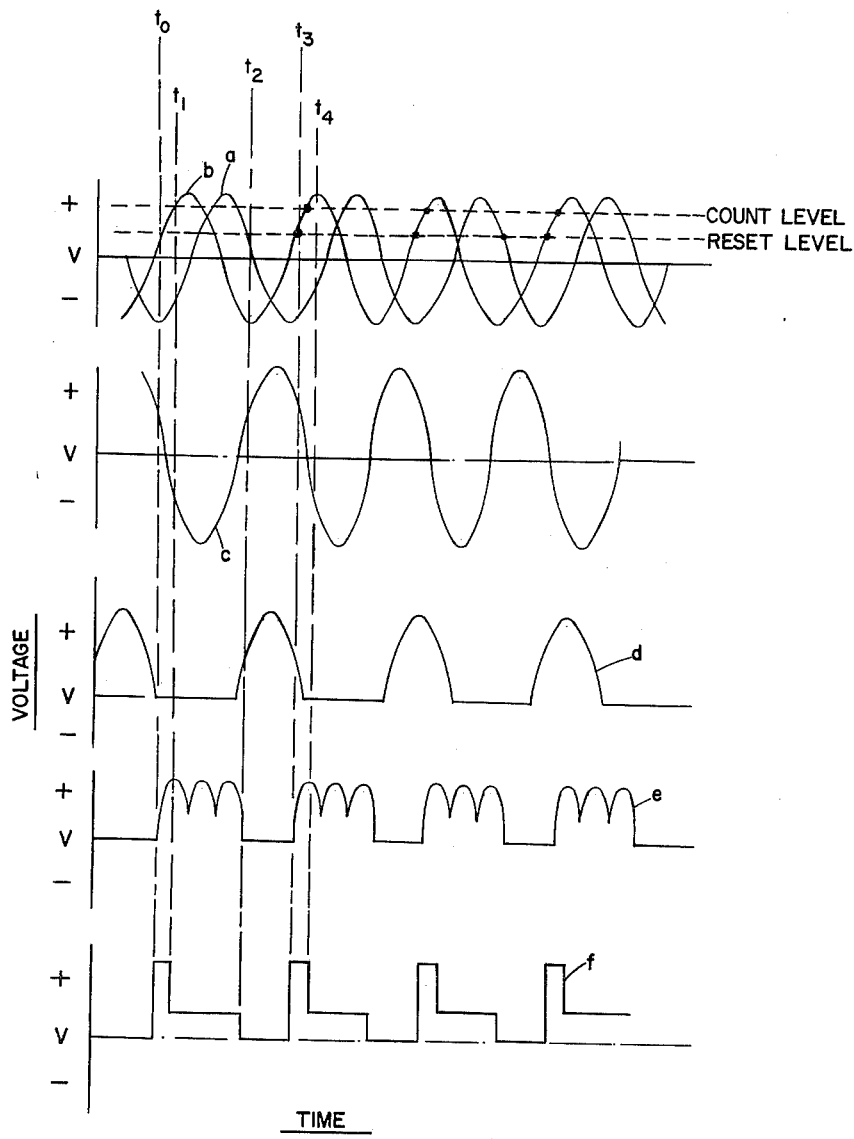
FIG. 3 is a graph illustrating the wave forms at the several input and output points of the circuit.

Referring now to FIG. 3, a voltage vs. time graph is shown illustrating the wave forms at the several input and output points of the circuit. Wave form (a) represents the output at the plate of triode 7, wave form (b) represents the plate of triode 8, wave form (c) represents the voltage induced in transformer 23, wave form (d) represents the signal applied to the grid of triode 28, wave form (e) represents the voltage at the cathode of thyratron 20, and wave form (f) represents the voltage at the plate of counter thyratron 36. In operation, assume that wave form (a) represents phase A of FIG. 2 and wave form (b) represents phase B of FIG. 2. Assume that in clockwise direction phase B is leading phase A. When the voltage on phase B, as represented by wave form (b) at the plate of triode 8 reaches a predetermined value called the count level, and denoted as $T_1$ in FIG. 3, counter thyratron 36 commences to conduct having received a positive going signal at its grid from the plate of triode 8. When the signal of phase A, represented by wave form (a) at the plate of triode 7, reaches the count level, thyratron 35 will not conduct because of the aforementioned positive bias on its cathode. Triodes 7 and 8 provide a summation signal (of wave forms a and b) to the reset circuit. The summation signal, appearing across transformer 23 and represented as wave form (c), is applied through rectifier 21 to the grid of triode 28 where it appears as represented by wave form (d). When the summation voltage of wave forms (a) and (b), as represented by (c) reaches a predetermined value, known as the reset level and denoted as time $T_2$ in FIG. 3, the voltage at the grid of triode 28 (wave form d) causes triode 28 to conduct lowering the voltage connected from the triode's plate to the control grid of thyratron 20. Thyratron 20 is cut off, thereby removing the plate voltage supply to counter thyratrons 35 and 36 as shown in wave form (e). Removal of the plate voltage to the thyratrons causes the voltage at the plate of thyratron 36 to drop as shown in wave form (f). Thyratrons 35 and 36 are now both cut off and their plate voltage supply circuit remains open until time $T_3$ when the voltage supplied to the grid of triode 28 (wave form d) by the summation of the signals from triodes 7 and 8 (wave form c) is insufficient to maintain the tube conducting and triode 28 ceases conduction. The plate voltage of triode 28 rises and being connected to the grid of thyratron 20 causes conduction in thyratron 20 thereby closing the circuit between the plate voltage supply and the plates of thyratrons 35 and 36. Thyratron 36 remains non-conductive because at time $T_3$ no grid signal is being received from triode 8 (wave form b). At time $T_4$ the voltage at triode 8 (wave form b) rises to the count level causing thyratron 36 to fire and produce a counting current through inductor 39.

The operation of the circuit would be the same if phase A were leading phase B except that counter thyratron 35 would be conducting and counter thyratron 36 would be locked out.

Although the embodiment of this invention contemplates the counting of shaft rotations and distinguishing between clockwise and counter clockwise direction of the shaft, by receiving electrical signals of 90 degrees phase difference from an alternating current resolver attached to the shaft, it is to be noted that the circuit may be adapted to other applications where electrical signals of different phases are to be counted and distinguished.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In combination, a first thyratron, a second thyratron, means for establishing operating potentials on said thyratrons, means for applying a plurality of phase sensible electrical signals to said thyratrons, means intercoupling said thyratrons whereby the thyratron first receiving one of said electrical signals prevents the other thyratron from conducting, and means responsive to the summation of said plurality of electrical signals for returning both of said thyratrons to cutoff when no signal from said means for applying electrical signals is being received by said thyratrons.

2. The combination recited in claim 1 wherein the means for returning both of said thyratrons to cutoff include switch means connected in series between said operating potentials and said thyratron to the output of said thyratrons and trigger means responsive to said phase reversible electrical signals and connected in series with the input of said switch means and the output of said thyratrons said switch means connected to be responsive to said summation of said electrical signals.

3. The combination recited in claim 1 wherein the means for applying electrical signals include a pair of demodulators sensitive to phase-reversible electrical signals, and a pair of amplifiers connected in series with the output of said demodulators and the control grid of said thyratrons.

4. In combination, a pair of demodulators sensitive to phase-reversible electrical signals, a pair of thyratrons whose control grid circuits are connected to receive the output of said demodulators, a trigger circuit responsive to a predetermined voltage level responsively connected to receive the output of said demodulators, and a grid controlled rectifier connected to the output of said trigger circuit, the output of said grid controlled rectifier connected to the plate circuits of said thyratrons.

5. In combination, a pair of demodulators, a pair of amplifiers each having its grid connected to the output of one of said demodulators, a pair of thyratrons each having its control grid connected to the plate of one of said amplifiers, the plate circuits of said amplifiers connected together to the primary of a transformer, a bridge rectifier connected to the secondary of said transformer, a trigger circuit, the input of said trigger circuit connected to the output of said bridge rectifier, a grid controlled rectifier having its control grid connected to the output of said trigger circuit, the plate of said grid controlled rectifier connected to an alternating current voltage, the cathode of said grid controlled rectifier connected in common to the plate circuits of said thyratrons.

6. Means for counting and determining the relative phase of two electrical waves comprising a first channel adapted to receive one of said electrical waves, means to measure the output of said first channel, a second channel adapted to receive the other of said electrical waves, means to measure the output of said second channel, means inter-coupling said channels whereby the channel receiving the electrical wave with the leading phase will conduct producing an output and prevent the other channel from conducting and producing an output, and means responsive to a predetermined voltage level of said electrical waves for returning both of said channels to their nonconducting state.

References Cited in the file of this patent
UNITED STATES PATENTS

| | | |
|---|---|---|
| 2,462,292 | Snyder | Feb. 22, 1949 |
| 2,481,347 | Riggen | Sept. 6, 1949 |
| 2,604,004 | Root | July 22, 1952 |
| 2,656,106 | Stabler | Oct. 20, 1953 |
| 2,685,082 | Beman et al. | July 27, 1954 |
| 2,731,201 | Harper | Jan. 17, 1956 |
| 2,796,598 | Cartwright | June 18, 1957 |
| 2,857,802 | Cail | Oct. 28, 1958 |